United States Patent [19]

Tripp

[11] 4,055,241
[45] Oct. 25, 1977

[54] CENTRIFUGAL CLUTCH MECHANISM

[76] Inventor: Dwight E. Tripp, 1409 Valley Drive, Longview, Tex. 75601

[21] Appl. No.: 709,790

[22] Filed: July 29, 1976

[51] Int. Cl.$^2$ .............................................. F16D 43/06
[52] U.S. Cl. .............................. 192/105 CE; 192/78; 192/111 T
[58] Field of Search .................. 192/105 BA, 105 CD, 192/105 CE, 103 B, 78, 3.31

[56] References Cited

U.S. PATENT DOCUMENTS

| 1,937,971 | 12/1933 | Mack | 192/105 CD |
| 2,048,435 | 7/1936 | Dodge | 192/105 CE |
| 2,099,676 | 11/1937 | Coffing | 192/105 CE |
| 2,104,014 | 1/1938 | Banker | 192/105 CE |
| 2,330,160 | 9/1943 | Tix | 192/105 CD |

FOREIGN PATENT DOCUMENTS

| 572,669 | 2/1924 | France | 192/105 CE |
| 471,302 | 2/1929 | Germany | 192/105 CE |

Primary Examiner—Benjamin W. Wyche
Attorney, Agent, or Firm—James L. Jackson

[57] ABSTRACT

A centrifugal clutch mechanism according to the present invention includes a pair of spaced clutch shoes, one being a power shoe and the other being an energizing shoe, that are movably supported by a rotor element that is rotated by a drive source. A clutch housing having an internal cylindrical surface for mating engagement with the clutch shoes is connected to a rotatable driven element and is rotatable along with the rotor element responsive to forces transferred to the clutch housing from the clutch shoes. Clutch energization or expansion is induced by a centrifugally movable modulating arm having a cam roller that has operative engagement with a cam surface provided on the energizing shoe. Centrifugally induced movement of the modulating arm is controlled by a slippage control spring and by an anti-self-energizing spring. A drive block supported by the rotor element transfers forces to the power shoe in a predetermined vectored relationship which may be modified by the angular relationship of the drive block engagement with the drive shoe.

18 Claims, 2 Drawing Figures

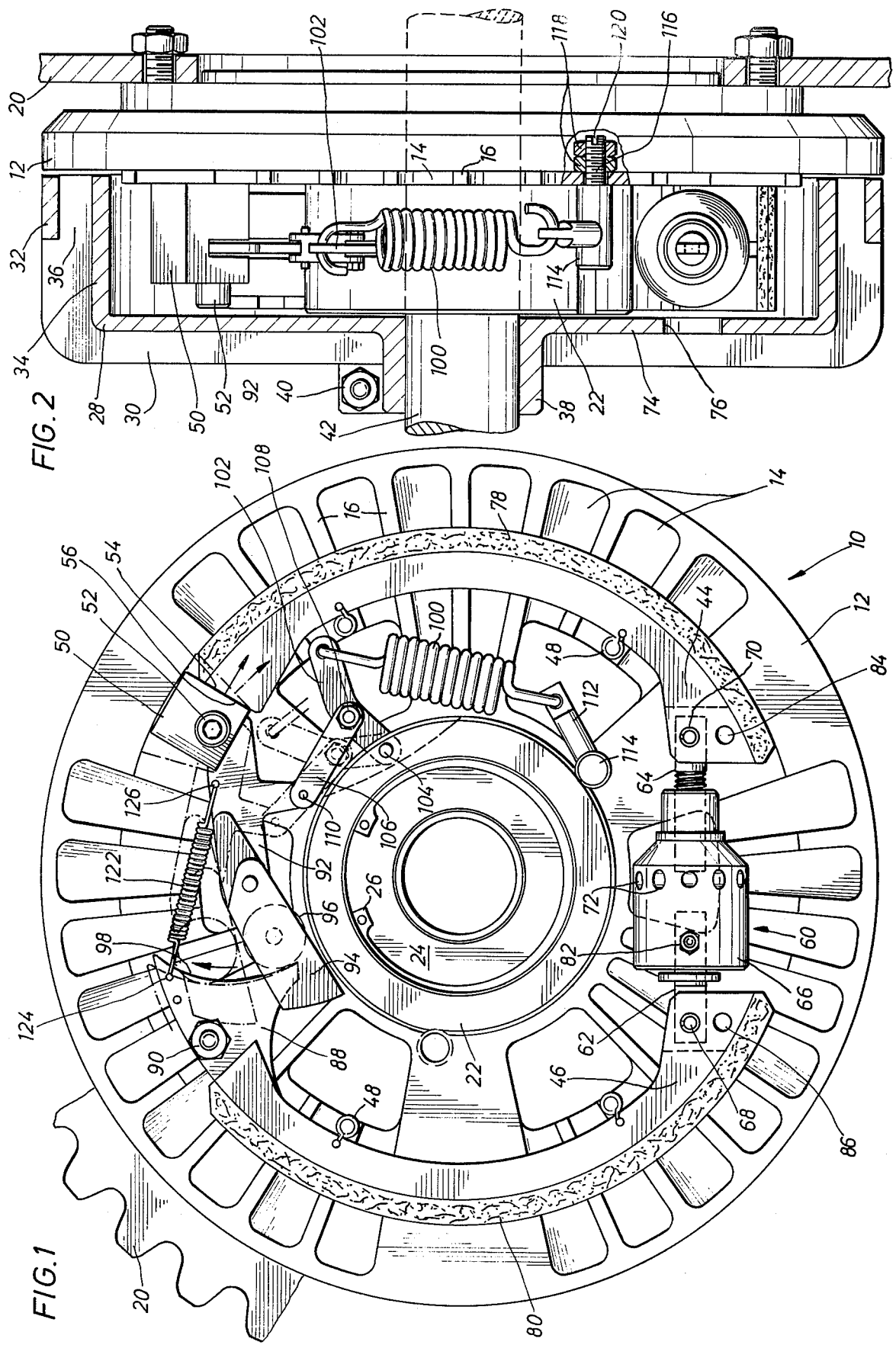

CENTRIFUGAL CLUTCH MECHANISM

FIELD OF THE INVENTION

This invention relates generally to centrifugal clutch mechanisms for mechanical transfer of energy from a rotatable drive source to a rotatable driven element. More particularly, the invention relates to a centrifugal clutch mechanism having opposed clutch shoes that expand to cause driving engagement between the rotor and the clutch housing with clutch expansion occurring responsive to a centrifugal force actuated cam energized movement controlled mechanism.

BACKGROUND OF THE INVENTION

Clutches for transfer of mechanical energy from one device to another are well known in the mechanical and electro-mechanical art. Centrifugally energized clutches are also known in the art for transfer of energy from one rotary element to another. Centrifugal clutches are utilized in various types of mechanical apparatus such as in connection with wheeled vehicles such as motorcycles, go-carts, etc., and in connection with transfer of rotary energy from a motor to a motor driven device. Other uses for centrifugal clutches is of course within the spirit and scope of the present invention.

Centrifugal clutch mechanisms that are presently available may be disadvantageous because of a number of common problems related to clutch slippage, smoothness of control, and preciseness of control capability. From the standpoint of clutch slippage, a primary problem concerns loss of high torque transfer when over-slippage occurs. When over-slippage occurs, optimum mechanical transfer of torque is often impossible because high torque is not available at the higher R.P.M. settings, especially when piston engines are utilized as the motive force. Also, excess clutch slippage generally results in excessive build up of heat which could cause even more slippage and result in damage to mechanical parts as well as acceleration of clutch wear. Clutch over-slippage is therefore a primary cause of excessively high maintenance and replacement costs and is also responsible for severe losses in performance.

In the operation of wheeled vehicles through the use of centrifugal clutch mechanisms it is typically desirable to facilitate smoothness of control during acceleration, cruise, and deceleration. It has been found to be extremely difficult to provide a centrifugally energized clutch mechanism that is capable of providing optimum smooth control for utilization in conjunction with wheeled vehicles that are also controllable.

Another problem concerning utilization of clutch mechanisms concerns precision control capability. In conjunction with wheeled vehicles, it is typically desirable to provide a centrifugal clutch mechanism that is subject to precision control in order to facilitate efficient vehicle handling at all engine speeds and during vehicle acceleration and deceleration. When vehicle speed is controlled by a centrifugal clutch mechanism that is responsive to throttle actuation of the engine providing the power for the vehicle, it is desirable that precision throttle control result in precision vehicle speed control. In the past such has been considered largely impractical at the lower clutch speeds when centrifugal clutches are utilized for energy transfer.

Where centrifugal clutches are utilized in conjunction with transfer of energy from a power device such as an electric motor to a driven rotary device such as a motor output shaft, it is desirable that the clutch be capable of being pre-programmed to stall the electric motor at any given speed until the load catches up with the torque output of the power source and they will lock up in direct drive. A tachometer or ampmeter can be used to monitor the system and adjust it to perform as desired. The clutch should be free of excessive heat build up as well as free from accelerated wear. These factors have always been problem areas when centrifugal clutch mechanisms are utilized in conjunction with such motor devices.

With the foregoing problems in mind, it is therefore a primary object of the present invention to provide a novel centrifugal clutch mechanism that is capable of operating relatively free of the usual slippage problems associated with centrifugal clutches.

It is also an important feature of the present invention to provide a novel centrifugal clutch mechanism that achieves effective energy transfer without excessive heat build up or excessive shoe wear.

Among the several features of the present invention is noted the contemplation of a novel centrifugal clutch mechanism that is uniquely designed to achieve effective smoothness of control at all operating speeds including acceleration, normal rotating speed, and deceleration.

It is an even further feature of the present invention to provide a novel centrifugal clutch mechanism that achieves precision control at all speeds including acceleration and deceleration, thus facilitating efficient handling and allowing more efficient operator control of the mechanical device that is powered through the clutch mechanism.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention. For example, although the present invention is described principally as it relates to utilization in conjunction with wheeled vehicles, it is intended that the clutch mechanism be equally adaptable to other mechanical rotary force transfer systems as well.

SUMMARY OF THE INVENTION

In accordance with the present invention, a centrifugal clutch mechanism for mechanical transfer of torque from a rotatable drive source to a rotatable driven element may be accomplished by providing a rotor element that is adapted to be directly rotated by the drive source. A pair of spaced opposed curved clutch shoes may be movably connected to the rotor element such as by a plurality of hold down springs which allow the clutch shoes to shift relative to the rotor element during operation of the clutch mechanism. For purposes of the present invention, a first one of the clutch shoes may be referred to as a power shoe while the other clutch shoe may be referred to as an energizing shoe. Spacing between opposed extremities of the power and energizing shoes may be accomplished by means of an adjustable spacer element. The spacer element effectively maintains predetermined spacing of the power and energizing shoes but this spacing may be adjusted as desired to compensate for shoe wear that occurs.

A drive block structure may be fixed to the rotor element and defines a drive shoulder that engages a drive force receiving surface provided on the power shoe. As the rotor element rotates, the rotational force of the rotor is induced directly into the power shoe by the drive block. The particular angular relationship between the drive block and the power shoe will determine the vector of the force that is induced to the power shoe. Depending upon the force characteristics that are desired, different drive block/power shoe angular relationships may be employed for the purpose of developing force transfer of particularly desirable characteristics.

As the power shoe and energizing shoe rotate along with the rotor element, it is desirable that the clutch shoes expand outwardly and establish frictional contact with the inner cylindrical surface of a clutch housing that is received about the clutch shoes. For the purpose of causing outward expansion of the shoes, the energizing shoe is provided with a cam element at the free extremity thereof. An elongated modulating arm may be pivotally supported by the rotor structure and may be provided with a suitable selection of different size weights that can be interchanged in order to facilitate centrifugally energized arm movement to suit a variety of needs. The modulating arm may be provided with a cam roller that engages the cam and causes expansion movement of the energizing shoe. The ratio of the cam and roller can be selected to accomplish desired results considering load, torque and speed requirements.

Centrifugal energization of the modulating arm occurs in opposition to the force of a slippage control spring that applies a spring force to the modulating arm through a control spring linkage to retard cam actuating outward movement of the modulating arm. The slippage control spring can be adjusted as desired to provide for precision movement of the modulating arm responsive to predetermined speed of rotor rotation. The slippage control spring is so connected to the modulating arm by the control spring linkage that the force applied to the arm by the spring is substantially constant. For example, the force of the slippage control spring may be adjusted for application of a force to the modulating arm that is 5 pounds. Regardless of the position of the modulating arm the force applied to the modulating arm by the spring will be substantially the preset 5 pounds. The spring force is controlled by the cooperative relation between the control linkage modulating arm and control spring. The substantially constant force as applied to the modulating arm by cooperative relation between the control linkage and the control spring, which cooperative relation may be attained by desired mechanical means such as disclosed herein. As the spring force increases during movement of spring 100 from the full line position to the broken line position, the mechanical advantage of the linkage interconnecting with the modulating arm decreases in such manner as to render the spring force applied to the modulating arm substantially constant. Controlled movement of the shoes is also assisted by means of an anti-self-energizing spring which may take the form of a tension spring interconnecting the cam of the energizing shoe and the base of the modulating arm. The anti-self-energizing spring applies a spring force to the cam to urge the energizing shoe and cam toward the modulating arm and roller.

This spring prevents the shoes from being driven by the drive block at the lower speeds and thus prevents the clutch system from being self-energizing at the lower speeds. This feature allows the clutch housing to be stationary at the low speeds while the shoes and other rotary components are free turning at low speeds.

The above and other objects and novel features of the instant invention will be readily apparent from the following description taken in conjunction with the accompanying drawings. It is to be expressly understood that the drawings are provided for the purpose of illustration only and are not intended to define the limits of the invention, but rather merely illustrate preferred embodiments and structures incorporating features of the instant invention.

In the accompanying drawings forming a part of this specification and wherein like reference numerals are employed to designate like parts:

FIG. 1 is a plan view of the rotor portion of a centrifugal clutch mechanism constructed in accordance with the present invention, illustrating in full and broken line various positions of the modulating arm and modulating arm structure and also showing in full and broken line specific angular relationships between the drive block and the power shoe of the clutch mechanism.

FIG. 2 is a partial elevational and partial sectional view of the clutch mechanism of FIG. 1 with a clutch housing structure shown in assembly with the rotor structure and with a portion of the rotor structure cut away and shown in section for the purpose of illustrating the adjustment mechanism for the slippage control spring.

DETAILED DESCRIPTION OF PREFERRED EMBODIMENT

Referring now to the drawings and particularly to FIG. 1, there is shown a centrifugal clutch mechanism generally at 10 that includes a rotor element 12 that is of generally circular configuration. Rotor element 12 may typically be formed of metal by casting in such manner as to define a plurality of internal depressions 14 that cooperate to define a plurality of internal ribs 16 that define cooling fins and assist in movement of air through the clutch mechanism for efficient cooling. The rotor element 12 may be also formed to define a plurality of air openings or passages that allow air to be drawn into the clutch mechanism for the purpose of cooling. As the rotor element rotates, the fin or rib elements 16, cooperating with the depressions 14 and air transfer openings, generally function as a fan to cause coolant air to be forced through the clutch mechanism. The rotor element 12 may be rotatably driven by any suitable power means such as by a sprocket partially illustrated at 20 which may receive a drive chain that induces rotary force transfer from a suitable motor device. The rotor element includes a centrally located annular boss 22 that is internally bored to receive a bearing structure 24 that is retained at each extremity thereof by snap rings 26 that are received within appropriate snap ring grooves. The internal boss 22 also provides structural support for other mechanical elements of the clutch mechanism as will be discussed in detail hereinbelow.

As shown in section in FIG. 2, the clutch mechanism incorporates a housing structure 28 which may be also formed of cast material such as metal and may be formed to define a plurality of fin elements 30 that function to cause movement of air as the clutch housing structure rotates along with the rotor structure 12. An annular structural band 32 may also be integral with the clutch housing structure which is separated from an annular generally cylindrical wall portion 34 of the housing in such manner as to define a plurality of air spaces 36 through which air may flow in conjunction with the depressions and fins of the rotor structure for the purpose of cooling.

An annular boss structure 38 integral with the clutch housing may be provided with a split portion that may be drawn together by means of a bolt and nut arrangement such as at 40 for the purpose of establishing a nonrotatable relationship with a clutch output shaft 42. The clutch output shaft may be nonrotatably connected to a suitable driven device such as the wheel of a vehicle, for example, thereby providing through the clutch mechanism for transfer of mechanical energy from a rotary power input to a rotatable driven device.

Energy transfer between the rotatable rotor element 12 and the clutch housing structure 28 is achieved by means of a pair of clutch shoes 44 and 46 that may be movably retained in assembly with the rotor element 12 by means of a plurality of hold down springs 48. The clutch shoe 44 will be referred to herein as the power shoe because it receives transfer of energy directly from the rotor mechanism as will be discussed in detail hereinbelow. The clutch shoe 46 will be referred to herein as the energizing shoe because frictional contact between the clutch shoes and the inter cylindrical wall of the housing structure is achieved through controlled movement of the energizing shoe. As shown at the upper portion of FIG. 1, a drive block element 50 may be secured to the rotor element 12 by means of a bolt or screw 52. The drive block is formed to define a drive force inducting shoulder 54 which mates with a drive force receiving surface 56 defined at one extremity of the power shoe. As shown in full lines, the drive block 50 may be of generally rectangular configuration and its engagement with the power shoe will define a force vector such as shown by the full line arrow. In the event it is desirable to induce a different force vector into the power shoe from the drive block the angular relationship between the drive block and the power shoe may be modified as desired. As shown in broken line in FIG. 1, a drive block of trapezoidal configuration associating with a mating extremity of the power shoe will provide a force vector such as shown by the broken line arrow.

When low speed operation of the clutch mechanism is more desirable, a drive block may be employed such as shown in full line in FIG. 1, thereby producing the force vector shown in full line. This feature provicdes a more self-energizing effect, which enables the clutch mechanism to function efficiently at lower operating speeds. The drive block structure illustrated in broken line in FIG. 1 is less self-energizing, developing the force vector shown by the broken arrow which allows optimum clutch control to occur at higher rotating speeds when more centrifugal force is available in the clutch system.

As shown in the lower portion of FIG. 1, the position of the power and energizing shoes may be established at opposed extremities thereof by means of an adjustment mechanism illustrated generally at 60. The adjustment mechanism may comprise a pair of threaded stud elements 62 and 64 that are threadedly received within an internally threaded bore formed in an adjustment rotor 66. The studs 62 and 64 are pivotally connected to the respective clutch shoes by means of connector pins 68 and 70. The adjustment rotor 66 is formed to define a plurality of recesses such as shown at 72 enabling an adjustment implement to be utilized for the purpose of imparting rotation to the adjustment rotor 66. As shown in FIG. 2, the circular wall structure 74 of the clutch housing 28 may be formed to define an adjustment slot 76, thereby allowing insertion of the adjustment implement through the slot to achieve rotatable positioning of the adjustment rotor as desired to facilitate optimum positioning of the lower opposed extremities of the clutch shoes. As the clutch shoe linings 78 and 80 become worn, the adjustment rotor may be appropriately manipulated to reduce the clearance of the clutch shoe linings with the internal cylindrical wall of the clutch housing. To prevent the adjustment rotor 66 from rotating freely, a friction element 82 may be threaded into the adjustment rotor to establish frictional engagement with the threaded stud 62.

Referring now, also, to the lower portion of FIG. 1, it is apparent that the clutch shoes are provided with lower connection apertures such as shown at 84 and 86. It should be borne in mind that connection of the wear adjustment mechanism 60 by means of the uppermost apertures as shown in FIG. 1 facilitates low speed operation of the clutch mechanism because such positioning increases the self-energizing effect of the clutch system. Connection of the wear adjustment mechanism 60 by means of the lower apertures 84 and 86 will facilitate employment of the clutch mechanism at higher speeds or when less torque is being put through the system because such positioning decreases the self-energizing effect of the clutch system. It should also be noted that the wear adjustment rotor 66 is of quite bulky configuration. This feature utilizes the weight of the wear adjustment rotor for the purpose of facilitating balance. In fact, the adjustment rotor 66 may be of any suitable weight that assist in the establishment of a balanced rotor condition. It is probable that different adjustment rotor weights would be desirable, depending upon the clutch shoe apertures to which the adjustment mechanism is connected.

As shown at the upper left portion of FIG. 1, a cam element 88 may be secured to the free extremity of the energizing shoe by means of a connecting bolt and nut arrangement 90. A modulating arm structure 92 may be pivotally connected to the drive block 50 by means of the pivot screw 52. To facilitate such connection, the drive block 50 may be formed to define a slot through which one extremity of the modulating arm 92 extends. The pivot screw or bolt 52 extends through the drive block and intersects the slot in such manner as to be received within an appropriate pivot aperture formed in the modulating arm 92.

The modulating arm 92 may be provided with a pair of spaced weight elements 94 that cooperate to define a slot within which is received a cam roller element 96. The weight elements are replaceable with other lighter or heavier weight elements depending on the results that are desired. The cam roller element 96 is positioned for operative engagement with a curved cam surface 98 which can be of any suitable cam ratio. As the modulating arm 92 pivots outwardly responsive to centrifugally induced forces, the cam roller 96, reacting against the curved cam surface 98, causes the energizing shoe to be expanded outwardly, thereby causing both shoes to increase frictional contact with the cylindrical internal surface of the clutch housing and thereby cause transfer of torque from the rotor to the housing.

Free outward movement of the modulating arm 92 is effectively retarded by means of a slippage control spring 100 that induces spring force to the modulating arm through a spring linkage that applies a constant force to the arm regardless of the force applied by the spring. The spring linkage may include a pivot arm 102 that may be pivotally connected to the annular boss 22 by means of a pivot pin 104 and a linkage bar 106 having pivotal engagement both with the pivot arm 102 and the modulating arm 92 by means of pivotal connections 108 and 110 respectively. The slippage control spring 100 is in turn connected to an adjustment arm 112 that extends outwardly from an adjustment pin 114. The adjustment pin shoulders on the rotor housing as shown in FIG. 2 and is provided with a threaded extension 116 that extends through an appropriate aperture formed in the rotor element. A pair of lock nuts 118 may be secured to the adjustment pin 114 for the purpose of locking it in position. A screw driver slot 120 may be formed in the adjustment pin extension 116 thereby allowing the adjustment pin 114 to be positioned through use of a screw driver or other suitable implement without necessitating disassembly of the clutch mechanism. After adjustment, the lock nuts 118 may be tightened, thereby securing the adjustment pin in the proper position to establish designed tensioning of the slippage control spring 100.

Although the centrifugal clutch mechanism of the present invention is particularly designed for rotation in a clockwise direction (as viewed in FIG. 1), this is not intended to limit the present invention in any manner. The clutch mechanism is specifically designed so that mere reversal of the various parts will facilitate clutch rotation in the opposite direction.

OPERATION

As the rotor element 12 is rotated such as through mechanical energy transmitted to the sprocket 20 shown in FIG. 2, centrifugal force is induced to the various mechanical parts of the clutch mechanism. Because the modulating arm 92 is pivoted at one extremity thereof and is provided with a substantial weight at the opposite extremity thereof, centrifugal force acting upon the modulating arm causes outward arm pivoting. This pivoting is controlled by the tension force applied to the modulating arm by the slippage control spring through the spring linkage including arm 102 and linkage 106. The position of the arm 112 extending from the adjustment pin 114 also serves to enhance the spring tension applied by the slippage control spring through the linkage to the modulating arm. Rotary force is induced from the rotor element through the drive block and to the power shoe with force being applied along a particular force vector between the drive block and power shoe. Depending upon the positioning of the clutch shoe adjustment mechanism shown at 60 in FIG. 1, force induced to the power shoe will be transmitted to the energizing shoe through the adjustment mechanism with the force being transmitted along a particular force vector. Since the free extremity of the energizing shoe is maintained in engagement with the cam roller of the modulating arm by the anti-self-energizing spring 122, movement of the energizing shoe is precisely controlled by the position of the modulating arm responsive to the centrifugal force being applied thereto. Through employment of the cam and cam roller arrangement actuated by the modulating arm responsive to centrifugal force, extremely precise movement of the clutch shoes can be obtained. This feature allows for precision control of the clutch mechanism making it precisely responsive to the rotory speed of the rotor element of the clutch system. The clutch shoes will be caused to move until a substantially frictional relation develops between the wear surfaces of the clutch shoes and the inner cylindrical wall of the clutch housing.

As rotor speeds decrease, centrifugal force acting upon the modulating arm 92 will also decrease and the tension of the slippage control spring acting through the spring linkage will cause inward pivoting movement of the modulating arm. The anti-self-energizing spring 122 will maintain the curved cam surface 98 in engagement with the cam roller of the modulating arm and will thereby cause the energizing shoe to be retracted, thereby reducing frictional contact with the cylindrical surface of the clutch housing. Retraction of the modulating arm through action of the slippage control spring together with retraction of the energizing shoe by the anti-self-energizing spring 122 will continue until the point that driving connection between the rotor element 12 and the clutch housing 28 becomes negligible.

In view of the foregoing, it is apparent that I have provided a novel centrifugal clutch mechanism that is capable of precision clutching movement responsive precisely to the speed of rotation that is induced. Through utilization of cam actuation of the energizing shoe and through employment of a uniquely controllable slippage control spring mechanism, the centrifugal clutch mechanism of the present invention is effectively designed for precision operation. Through control of clutch slippage during operation at varying speeds, such problems as loss of energy transfer, excessive heat build up and excessive shoe wear and overslipping are effectively reduced. The clutch mechanism of the present invention effectively achieves smoothness of control operation during all speeds of rotation including acceleration, normal operation and deceleration. The clutch mechanism also provides for precision control, thereby allowing the clutch to be effectively utilized for speed control purposes for wheeled vehicles as well as other mechanical devices.

For application as the torque transmission system in wheeled vehicles such as go-carts, the clutch system of this invention is particularly designed to operate at substantially half of the usually expected speed of rotation at approximately twice the torque.

Having thus fully described my invention, I claim:

1. A centrifugal clutch mechanism for mechanical transfer of energy from a rotatable drive source to a rotatable driven element, said clutch mechanism comprising:

a rotor element adapted to be directly rotated by said drive source;

a power shoe being movably supported by said rotor element and being rotatable therewith;

adjustable drive means being fixed to said rotor element and releasably engaging said power shoe and imparting a preselected force vector from said rotor element to said power shoe;

an energizing shoe also being movably supported by said rotor element and being rotatable with said rotor element, said energizing shoe being in spaced opposed relation with said power shoe;

adjustable positioning means engaging opposed extremities of said power shoe and said energizing shoe and maintaining a predetermined spacing therebetween;

a shoe movement control means being movably supported for rotation along with said rotor element, said movement control means being movable by centrifugal force as said rotor element rotates, said shoe movement control means imparting expansion movement to said energizing shoe responsive to movement of said movement control means;

adjustable means retarding movement of said shoe movement control means; and clutch housing means to which said rotatable driven element is nonrotatably connected, said clutch housing means defining a cylindrical internal clutch surface for engagement by said power shoe and energizing shoe.

2. A centrifugal clutch mechanism as recited in claim 1, wherein said shoe movement control means comprises:

modulating arm means being pivotally connected at one extremity thereof to said rotor element; and reaction means defined by said energizing shoe, said reaction means being engaged by said modulating arm means and reacting with said modulating arm means to cause said expansion movement of said energizing shoe.

3. A centrifugal clutch mechanism as recited in claim 2, wherein said movement retarding means comprises:

a slippage control spring means imparting a retarding force to said modulating arm means to oppose centrifugal force induced movement of said modulating arm means.

4. A centrifugal clutch mechanism as recited in claim 2, wherein said movement retarding means comprises:

a movement control linkage being connected to said modulating arm means and said rotor means; and a slippage control spring being connected to said movement control linkage and said rotor means and imparting spring force through said movement control linkage to said modulating arm means said movement control linkage and said slippage control spring cooperating to apply substantially constant force to said modulating arm means during operation.

5. A centrifugal clutch mechanism as recited in claim 4, wherein said movement retarding means includes:

an adjustment element being adjustably connected to said rotor means; and said slippage control spring being connected to said adjustment element.

6. A centrifugal clutch mechanism as recited in claim 1, wherein said shoe movement control element comprises:

modulating arm means being pivotally connected at one extremity thereof to said rotor element;

a reaction cam being provided at one extremity of said energizing shoe; and a cam follower element being provided on said modulating arm means and engaging said reaction cam, upon centrifugal force energized movement of said modulating arm means said cam follower element reacting with said reaction cam and forcing said energizing shoe toward energizing position thereof.

7. A centrifugal clutch mechanism as recited in claim 1, wherein said shoe movement control means includes:

urging means engaging said energizing shoe and being operative to impart a force to said energizing shoe that opposes movement of said energizing shoe toward the energizing position thereof.

8. A centrifugal clutch mechanism as recited in claim 6, wherein said cam follower element comprises:

a cam roller rotatably supported by said modulating arm and being positioned for engagement with said reaction cam.

9. A centrifugal clutch mechanism as recited in claim 2, wherein said movement control means includes:

an anti-self energizing spring being connected to said modulating arm and said reaction means and imparting a spring force to said energizing shoe that opposes movement of the energizing shoe toward the energizing position thereof.

10. A centrifugal clutch mechanism as recited in claim 6, wherein said shoe movement control means includes:

an anti-self energizing spring being connected to said reaction cam and said modulating arm means and imparting a spring force to said self-energizing shoe that opposes movement of said self-energizing shoe toward the energizing position thereof.

11. A centrifugal clutch mechanism as recited in claim 1, wherein:

a drive block is fixed to said rotor element and defines a drive force inducing shoulder; and said power shoe defines a drive force receiving surface disposed in engagement with said force inducing shoulder, the predetermined angular relationship of said drive force inducing shoulder and said drive force receiving surface determining a force vector transmitted to said power shoe from said drive block.

12. A centrifugal clutch mechanism for mechanical transfer of energy from a rotatable drive source to a rotatable driven element, said clutch mechanism comprising:

a rotor element adapted to be directly rotated by said drive source;

a power shoe being movably supported by said rotor element and being rotatable therewith;

drive means being fixed to said rotor element and releasably engaging said power shoe and imparting a preselected force vector from said rotor element to said power shoe;

an energizing shoe being movably supported by said rotor element and being rotatable with said rotor element, said energizing shoe being in spaced opposed relation with said power shoe;

adjustable positioning means being interposed between opposed extremities of said power and energizing shoes and maintaining a predetermined spacing between said opposed extremities;

elongated modulating arm means being pivotally connected at one extremity thereof to said rotor element;

a reaction cam being provided at one extremity of said energizing shoe;

a cam follower element being provided on said modulating arm means and engaging said reaction cam, upon centrifugal force energized movement of said modulating arm means said cam follower element reacting with said reaction cam and forcing said energizing shoe toward the energizing position thereof;

adjustable means inducing an opposing force to said modulating arm to resist centrifugal force energized movement of said modulating arm; and clutch housing means to which said rotatable driven element is nonrotatably connected, said clutch housing means defining a cylindrical integral clutch surface for engagement by said power shoe and said energizing shoe.

13. A centrifugal clutch mechanism as recited in claim 12, wherein said means inducing an opposing force to said modulating arm means comprises:

a slippage control spring element interconnecting said rotor element and said modulating arm, said slippage control spring urging said modulating arm means in a direction opposing centrifugal force induced movement of said modulating arm means.

14. A centrifugal clutch mechanism as recited in claim 12, wherein said means inducing an opposing force to said modulating arm means comprises:

a slippage control spring element having one extremity thereof connected to said rotor element; and control linkage means interconnecting the opposed extremity of said slippage control spring and said modulating arm means, said control linkage means being operative to multiply the spring force of said slippage control spring means being applied through said control linkage to said modulating arm means.

15. A centrifugal clutch mechanism as recited in claim 12, wherein said cam follower element comprises:

a cam roller being rotatably supported by said modulating arm means and being positioned for engagement with said reaction cam; and means for maintaining said cam roller and said reaction cam in engagement during movement of said modulating arm and energizing shoe.

16. A centrifugal clutch mechanism as recited in claim 13, wherein said means inducing an opposing force to said modulating arm means includes:

adjustment means interconnecting said slippage control spring to said rotor element, said adjustment means being accessible in the assembled condition of said clutch mechanism to facilitate adjustment of the tension of said slippage control spring.

17. A centrifugal clutch mechanism as recited in claim 14, wherein said control linkage means comprises:

a pivot arm having pivotal connection with said rotor element at one extremity thereof and defining a free extremity, said slippage control spring being connected to said free extremity of said pivot arm;

a linkage bar being pivotally connected at one extremity thereof to said modulating arm and being pivotally connected at the opposite extremity thereof intermediate the extremities of said pivot arm.

18. A centrifugal clutch mechanism as recited in claim 12, wherein said modulating arm means of said clutch mechanism includes:

weight means provided on said modulating arm and rendering said modulating arm means controllably movable responsive to centrifugal force development upon rotation of said rotor element; and balancing means provided on said rotor element and offsetting the weight of said weight means.

* * * * *